United States Patent
Johnson et al.

(10) Patent No.: US 6,577,951 B1
(45) Date of Patent: Jun. 10, 2003

(54) SPLIT PPS/SPS ARCHITECTURE FOR MILITARY AIRCRAFT FLYING IN CIVILIAN AIRSPACE

(75) Inventors: Mark W. Johnson, Cedar Rapids, IA (US); Richard J. Ross, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/664,259

(22) Filed: Sep. 18, 2000

(51) Int. Cl.$^7$ .......................... G05B 17/02; G08B 23/00
(52) U.S. Cl. ..................... 701/213; 342/457; 701/301
(58) Field of Search .......................... 701/213, 207, 701/219, 120, 122; 342/36, 357.1, 457, 37, 32, 26, 29; 455/456

(56) References Cited

U.S. PATENT DOCUMENTS

| | | | | |
|---|---|---|---|---|
| 4,706,198 A | * | 11/1987 | Thurman | 364/439 |
| 5,459,469 A | * | 10/1995 | Schuchman et al. | 342/37 |
| 5,541,863 A | * | 7/1996 | Magor et al. | 364/580 |
| 5,663,720 A | * | 9/1997 | Weissman | 340/934 |
| 5,798,726 A | * | 8/1998 | Schuchman et al. | 342/37 |
| 5,936,552 A | * | 8/1999 | Wichgers et al. | 340/963 |

OTHER PUBLICATIONS

"Aid inertial land navigation system (ILANA) with a minimum set of inertial sensors". Daum, P. Beyer, J.; Kohler, T.F.W., Source : Position location and navigation Symposium, 1994 , pp. 284–291, Apr. 11–15, 1994.*

"Sole means navigation in US navy aircraft." Lowenstein, G.; Phanos, J.; Rish, E. , Source: IEEE aerospace and electronics system magazine , pp. 16–22 , Aug. 1988.*

"An overview of civil airspace changes impacting interoperability with military aircraft". La Forge, L.G. , Source : Digital Avionics systems conference, 1998. Proceed 17 th DASC. The AIAA / IEEE / SAE , pp. F14/1—F14/9 vol. 2, Oct. 31–Nov. 7, 1998.*

"Avionics architecture study for air mobility command aircraft". White, B.E. , Source: Digital avionics systems conference, 1997, 16th D/ AIAA / IEEE , pp. 3.2—1.7 vol. 1, Oct. 26–30, 1997.*

Proposed avionics architecture for air force mobility command aircraft to meet CNS / ATM and GATM requirements . Happel, D.A. Source : Digital avionics system conference, 1998. Proceed 17th DASC. The AIAA / IEEE / SAE. pp. F16/1—F16 /9 vol.*

* cited by examiner

Primary Examiner—Tan Nguyen
Assistant Examiner—Dalena Tran
(74) Attorney, Agent, or Firm—Nathan O. Jensen; Kyle Eppele

(57) ABSTRACT

In an exemplary embodiment of the present invention, a navigation system suitable for use in civilian airspace includes a first precise positioning service (PPS) global positioning system (GPS) receiver in a first line replaceable unit (LRU). A second standard positioning service (SPS) global positioning system (GPS) receiver in either the same line replaceable unit (LRU) or in a second line replaceable unit (LRU) is also included. The second standard positioning service (SPS) global positioning system (GPS) receiver is suitable for at least one of certification, upgrade and replacement independent of the first precise positioning service (PPS) global positioning system (GPS) receiver.

7 Claims, 7 Drawing Sheets

| OPTIONS | OPTION 1: COMBINED SPS & PPS RECEIVER (NON-CERTIFIED) | OPTION 2: COMBINED SPS & PPS RECEIVER (CERTIFIED) | OPTION 3: SPS (CERTIFIED) & PPS (NON-CERTIFIED) RECEIVER IN ONE LRU (SPS/PPS) | OPTION 4: SEPARATE SPS (CERTIFIED) & PPS (NON-CERTIFIED) RECEIVER, SEPARATE LRUS SPS/PPS |
|---|---|---|---|---|
| SPS CERTIFIED? | NO | YES | YES | YES |
| PPS CERTIFIED? | NO | NO | NO | NO |
| LRU CERTIFED? | NO | NO | YES | YES – SPS NO - PPS |

| OPTIONS | OPTION 1: COMBINED SPS & PPS RECEIVER (NON-CERTIFIED) | OPTION 2: COMBINED SPS & PPS RECEIVER (CERTIFIED) | OPTION 3: SPS (CERTIFIED) & PPS (NON-CERTIFIED) RECEIVER IN ONE LRU (SPS/PPS) | OPTION 4: SEPARATE SPS (CERTIFIED) & PPS (NON-CERTIFIED) RECEIVER, SEPARATE LRUS SPS/PPS |
|---|---|---|---|---|
| SPS CERTIFIED? | NO | YES | YES | YES |
| PPS CERTIFIED? | NO | NO | NO | NO |
| LRU CERTIFED? | NO | NO | YES | YES – SPS NO - PPS |

*FIG. 1*

EVALUATION CRITERIA

| COST ASPECT: | OPTION 1: COMBINED SPS & PPS RECEIVER (NON-CERTIFIED) | OPTION 2: COMBINED SPS & PPS RECEIVER (CERTIFIED) | OPTION 3: SPS (CERTIFIED) & PPS (NON-CERTIFIED) RECEIVER IN ONE LRU (SPS/PPS) | OPTION 4: SEPARATE SPS (CERTIFIED) & PPS (NON-CERTIFIED) RECEIVER, SEPARATE LRUS SPS/PPS |
|---|---|---|---|---|
| SYSTEM DEVELOPMENT COSTS | LOW | LOW | MEDIUM | MEDIUM |
| RECEIVER DEVELOPMENT COSTS | LOW | HIGH | LOW | LOW |
| INITIAL SYSTEM INTEGRATION COSTS | LOW | C/A: LOW SINCE MMR ALREADY DRIVES INSTRUMENTS P(Y): MED, TO REWIRE TO UNIQUE PPS INTERFACES | C/A: LOW, SINCE MMR ALREADY DRIVES INSTRUMENTS P(Y): MED, TO REWIRE TO UNIQUE PPS INTERFACES | LOW |
| AIRCRAFT CERTIFICATION COSTS | VERY HIGH (NON CERTIFIED PPS AND SPS) | LOW | LOW | LOW |

*FIG. 3*

EVALUATION CRITERIA

| UPGRADE COSTS | OPTION 1: COMBINED SPS & PPS RECEIVER (NON-CERTIFIED) | OPTION 2: COMBINED SPS & PPS RECEIVER (CERTIFIED) | OPTION 3: SPS (CERTIFIED) & PPS (NON-CERTIFIED) RECEIVER IN ONE LRU (SPS/PPS) | OPTION 4: SEPARATE SPS (CERTIFIED) & PPS (NON-CERTIFIED) RECEIVER, SEPARATE LRUS SPS/PPS |
|---|---|---|---|---|
| SAASM | LOW | VERY HIGH (RECERTIFICATION) | MEDIUM (SMALL RECERTIFICATION) | LOW |
| WAAS | LOW | VERY HIGH (RECERTIFICATION) | MEDIUM (SMALL RECERTIFICATION) | LOW |
| LAAS | LOW | VERY HIGH (RECERTIFICATION) | MEDIUM (SMALL RECERTIFICATION) | LOW |
| JPALS | LOW | VERY HIGH (RECERTIFICATION) | MEDIUM (SMALL RECERTIFICATION) | LOW |
| LM | LOW | VERY HIGH (RECERTIFICATION) | MEDIUM (SMALL RECERTIFICATION) | LOW |
| LC | LOW | VERY HIGH (RECERTIFICATION) | MEDIUM (SMALL RECERTIFICATION) | LOW |
| EQUIPMENT COSTS | $8,000 | $15,000 | $15,000 TO 20,000 | $15,000 TO 20,000 |
| EQUIPMENT SIZE | SMALL | SMALL | SMALL | MEDIUM |
| LIFE-CYCLE COSTS | LOW | MEDIUM | MEDIUM | LOW |

*FIG. 4*

EVALUATION CRITERIA

| RISKS/ ISSUES: | OPTION 1: COMBINED SPS & PPS RECEIVER (NON-CERTIFIED) | OPTION 2: COMBINED SPS & PPS RECEIVER (CERTIFIED) | OPTION 3: SPS (CERTIFIED) & PPS (NON-CERTIFIED) RECEIVER IN ONE LRU (SPS/PPS) | OPTION 4: SEPARATE SPS (CERTIFIED) & PPS (NON-CERTIFIED) RECEIVER, SEPARATE LRUS SPS/PPS |
|---|---|---|---|---|
| OPERATIONAL IMPACT | QUESTIONABLE CIVIL INTEROPERABILITY IF AIRCRAFT NOT CERTIFIED | CIVIL INTEROPERABILITY GOOD. | CIVIL INTEROPERABILITY GOOD. | CIVIL INTEROPERABILITY GOOD. |
| CERTIFICATION IMPACT | DIFFICULT TO CERTIFY AIRCRAFT BECAUSE GPS RECEIVER NOT CERTIFIED. NO RECERTIFICATION OF GPS WHEN CHANGED. | QUESTIONABLE AIRCRAFT CERTIFICATION TSP COULD BE INVALIDATED IF PPS RECEIVER IS ALLOWED TO DRIVE LANDING INSTRUMENTS MUST RE-CERTIFY RECEIVER AFTER EVERY MODIFI-CATION | EASY AIRCRAFT CERTIFICATION ASSUMING THAT PPS RECEIVER DOES NOT DRIVE THE LANDING INSTRUMENTS MUST DO SMALL LRU RECERTIFICATION WHEN PPS IS CHANGED. | EASY AIRCRAFT CERTIFICATION. ONLY RECERTIFY WHEN SPS RECEIVER IS CHANGED. |
| UPGRADE ISSUES | NONE | RECERTIFICATION COSTS WILL DELAY UPGRADES. | MUST REINTEGRATE AND RECERTIFY THE LRU WHEN UPGRADING. | NONE |

*FIG. 5*

SPLIT PPS/SPS ARCHITECTURE FOR MILITARY AIRCRAFT FLYING IN CIVILIAN AIRSPACE

BACKGROUND OF THE INVENTION

The present invention generally relates to the field of aircraft navigation, and particularly to a split PPS/SPS architecture for military aircraft flying in civilian airspace.

Emerging Global Air Traffic Management (GATM) and Joint Precision Approach and Landing System (JPALS) requirements continue to drive military aircraft toward a need for civil interoperability when engaged in flight in the national airspace. However, this interoperability cannot compromise the performance of military aircraft systems when in a tactical environment. Military aircraft are increasingly being required to show "civil interoperability" up to, and including Federal Aviation Administration (FAA)/civil aviation authority (CAA) certification of onboard equipment, including GPS equipment.

The tremendous growth in air traffic presents increasing challenges for air traffic service providers, air carriers, and the military. Such growth is straining airspace capacity and airport resources. The air traffic system requires significant upgrades to increase system capacity and flight efficiency while continuing to meet flight safety standards. The International Civil Aviation Organization (ICAO), Federal Aviation Administration (FAA), and other civil aviation authorities (CAA) plan to implement a new air traffic architecture to meet this need. This new architecture takes advantage of emerging technologies in communication, navigation, and surveillance to improve air traffic management.

The current plan is to implement a new air traffic environment to culminate in 2010 with the attainment of dynamic routing, commonly referred to in the U.S. as "free flight." Dynamic routing gives operators the freedom to choose their own routes, speeds, and altitudes, in real-time, thus providing visual flight rules (VFR) flexibility with instrument flight rules (IFR) protection and separation and a shift from air traffic control (ATC) to air traffic management (ATM). The civil aviation community refers to these changes as Communication, Navigation, Surveillance/Air Traffic Management (CNS/ATM). Due to the major impact to Department of Defense global operations, these new concepts will be referred to as Global Air Traffic Management (GATM).

The ability to reduce aircraft separations and implement other new air traffic management (ATM) procedures while maintaining or improving safety standards is based on the use of new technology. The most critical technology elements of the new Communication, Navigation, Surveillance/Air Traffic Management (CNS/ATM) environment are satellite-based navigation, increased use of data links rather than voice for pilot/controller communication in oceanic/remote airspace as well as en-route and terminal environments, and improved surveillance that will enhance both ground and cockpit situational awareness. If aircraft are not equipped with the appropriate new technologies, they will not be able to operate in airspace where new separation standards and ATM procedures are implemented by civil aviation authorities, and will therefore be excluded from that airspace. For Department of Defense aircraft to operate in this new environment, significant modifications to existing aircraft must be accomplished.

One element of the GATM problem is Satellite based navigation or GPS. Implementation of GPS in all military aircraft is now mandated by 2005. To meet this mandate, military aircraft system program offices (SPOs) integrated P(Y) code GPS in three basic configurations: stand-alone receiver 3A, Miniature Airborne GPS Receiver (MAGR), cargo utility GPS receiver (CUGR), integrated with a flight management system (FMS) CDNU GPS Embedded Module (CGEM), or embedded/integrated with an inertial (GPS Embedded Module (GEM)), or GRAM.

Historically, the military and the civilian market follow different paths to certify their systems for flight. The FAA/CAA drives a process intensive, regimented development process to ensure a receiver meets the technical standard order (TSO) for flight critical systems. The military also follows a regimented development process; however, to date most military systems are not required to meet the FAA/CAA guidelines. Instead, the military self-certifies their systems as meeting the needs for flight in civil airspace.

To meet the emerging GATM requirements, the military market encourages the use of commercially available aviation equipment. However, military and civil markets have diverging requirements. For the civilian market, Local Area Augmentation System (LAAS), Wide-Area Augmentation System (WAAS) and the new civil frequency are the near term driving requirements. In the military market, Wide-Area Augmentation System (WAAS), Joint Precision Approach and Landing System (JPALS), the new military M-Code Signal (Lm), selective availability anti-spoofing module (SAASM) and navigation warfare (NAVWAR) anti-jamming (AJ) enhancements are driving requirements. This divergence in driving requirements is causing a debate over the best way to pre-position aircraft for flight in civil airspace and address the concerns to meet the divergent civil and military needs.

The first part of the controversy is the use of precise encrypted P(Y) code GPS in civil airspace. P(Y) GPS is designed to meet the rigorous needs of the tactical military environment. Unfortunately, the drive for military use complicates and diverges from the goals of a civil certified GPS receiver. PPS receivers utilize L1 and L2 to calculate the GPS position and perform ionosphere corrections. L1 is a protected frequency for safety of flight operations, but L2 is not. Therefore, in order for the PPS receiver to operate in the civil airspace, the receiver must be capable of excluding L2 from the solution.

A second issue is the certification of PPS receivers by foreign CAA. The current generation of PPS receiver has classified software that is not accessible for inspection by foreign governments (the exception is Category A & B memorandum of understanding (MOU) countries). Since every foreign government retains the right to approve aviation equipment for flight in their sovereign airspace, they need to be able to inspect the software operating within the GPS receiver. To utilize a PPS receiver, the military would require a country-by-country waiver or agreement to allow the use of a PPS receiver within their airspace. This is further complicated with the incorporation of Selective Availability Anti-Spoofing Module (SAASM) since no foreign government has access to the classified algorithms within the Selective Availability Anti-Spoofing Module (SAASM).

Finally, a technical standard order (TSO) does not exist for a PPS receiver. While a manufacturer may claim some level of TSO or TSO equivalency, the fact remains that a TSO has not been written for PPS receivers and therefore the PPS portion of a receiver can not be TSO'd. In addition, it is unlikely that a TSO will be developed in the near future because of the issues presented previously.

Therefore, it would be desirable to provide a navigation system that is suitable for certification by civil aviation authorities (CAA) yet still provide the tactical environment capability (high anti-jam, anti-spoof) required for military needs.

SUMMARY OF THE INVENTION

Accordingly, the present invention is directed to a split PPS/SPS architecture for military aircraft flying in civilian airspace. To satisfy disparate Civil and Military aviation requirements, separate GPS receivers will satisfy the operational need of the Military User and the certification requirements of the Civil Aviation Authorities (CAA) at a lower life cycle cost than an approach to meet both requirements in a single receiver.

In a first aspect of the present invention, a navigation system suitable for use in civilian airspace, includes a first precise positioning service (PPS) global positioning system (GPS) receiver in a first line replaceable unit (LRU). A second standard positioning service (SPS) global positioning system (GPS) receiver in a second line replaceable unit (LRU) is also included. The second standard positioning service (SPS) global positioning system (GPS) receiver in the second line replaceable unit (LRU) is suitable for at least one of certification, upgrade and replacement independent of the first precise positioning service (PPS) global positioning system (GPS) receiver in the first line replaceable unit (LRU).

In a second aspect of the present invention, a vehicle including a navigation system includes a first precise positioning service (PPS) global positioning system (GPS) receiver in a first line replaceable unit (LRU). A second standard positioning service (SPS) global positioning system (GPS) receiver in a second line replaceable unit (LRU) is also included. The second standard positioning service (SPS) global positioning system (GPS) receiver in the second line replaceable unit (LRU) is suitable for at least one of certification, upgrade and replacement independent of the first precise positioning service (PPS) global positioning system (GPS) receiver in the first line replaceable unit (LRU).

In a third aspect of the present invention, a navigation system suitable for use in civilian airspace, includes a first precise positioning service (PPS) global positioning system (GPS) receiver in a first line replaceable unit (LRU). A second standard positioning service (SPS) global positioning system (GPS) receiver in a second line replaceable unit (LRU) is also included. The second standard positioning service (SPS) global positioning system (GPS) receiver in the second line replaceable unit (LRU) is certified under a technical standard order corresponding to operation utilizing a standard positioning service and is suitable for at least one of certification, upgrade and replacement independent of the first precise positioning service (PPS) global positioning system (GPS) receiver in the first line replaceable unit (LRU).

In a fourth aspect of the present invention, a navigation system suitable for use in civilian airspace includes a line replaceable unit (LRU). A first precise positioning service (PPS) global positioning system (GPS) receiver and a second standard positioning service (SPS) global positioning system (GPS) receiver are included with the line replaceable unit (LRU). The second standard positioning service (SPS) global positioning system (GPS) receiver is suitable for at least one of certification, upgrade and replacement independent of the first precise positioning service (PPS) global positioning system (GPS).

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a table depicting exemplary options for compliance with flight requirements in civilian airspace;

FIG. 3 is a chart illustrating exemplary evaluation criteria including cost aspects of the exemplary options shown in FIGS. 1 and 2;

FIG. 4 is a chart illustrating exemplary evaluation including upgrade costs of the exemplary options shown in FIGS. 1 and 2;

FIG. 5 is a chart is shown illustrating exemplary evaluation criteria including risks and issues of the exemplary options shown in FIGS. 1 and 2;

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are disclosed.

There are a number of choices to satisfy future airspace requirements: combined SPS & PPS receiver—not certified; combined SPS & PPS receiver—certified; separate SPS (TSO'd) & PPS (non-TSO'd) receivers in one line replaceable unit (LRU); or separate SPS (TSO'd) & PPS (non-TSO'd) receivers in separate line replaceable units, examples of which are shown in FIG. 1. The first option is a combined SPS and PPS receiver that is not SPS TSO'd, not PPS TSO'd, and not LRU certified. The second option is a combined SPS and PPS receiver, wherein the SPS receiver is TSO'd, the PPS is not TSO'd, and it is line replaceable unit (LRU) certified. The third option is a separate SPS & PPS receiver in one line replaceable unit (LRU), where it is SPS TSO'd, is not PPS TSO'd and is line replaceable unit (LRU) certified. The fourth option is a separate SPS & PPS receiver in separate line replaceable units, wherein the SPS is TSO'd, the PPS is not TSO'd, and the SPS is line replaceable unit certified and the PPS is not line replaceable unit certified. Certification of the LRU will include testing to meet the applicable RTCA requirements levied on that LRU. It should be appreciated that there are numerous other possible permutations of the options shown in FIG. 1. However, these options are shown for the sake of clarity of the discussion as representative of the most likely set of options to be analyzed given the current military GPS integration and the emerging GATM requirements for civil compatibility.

Figure 2:
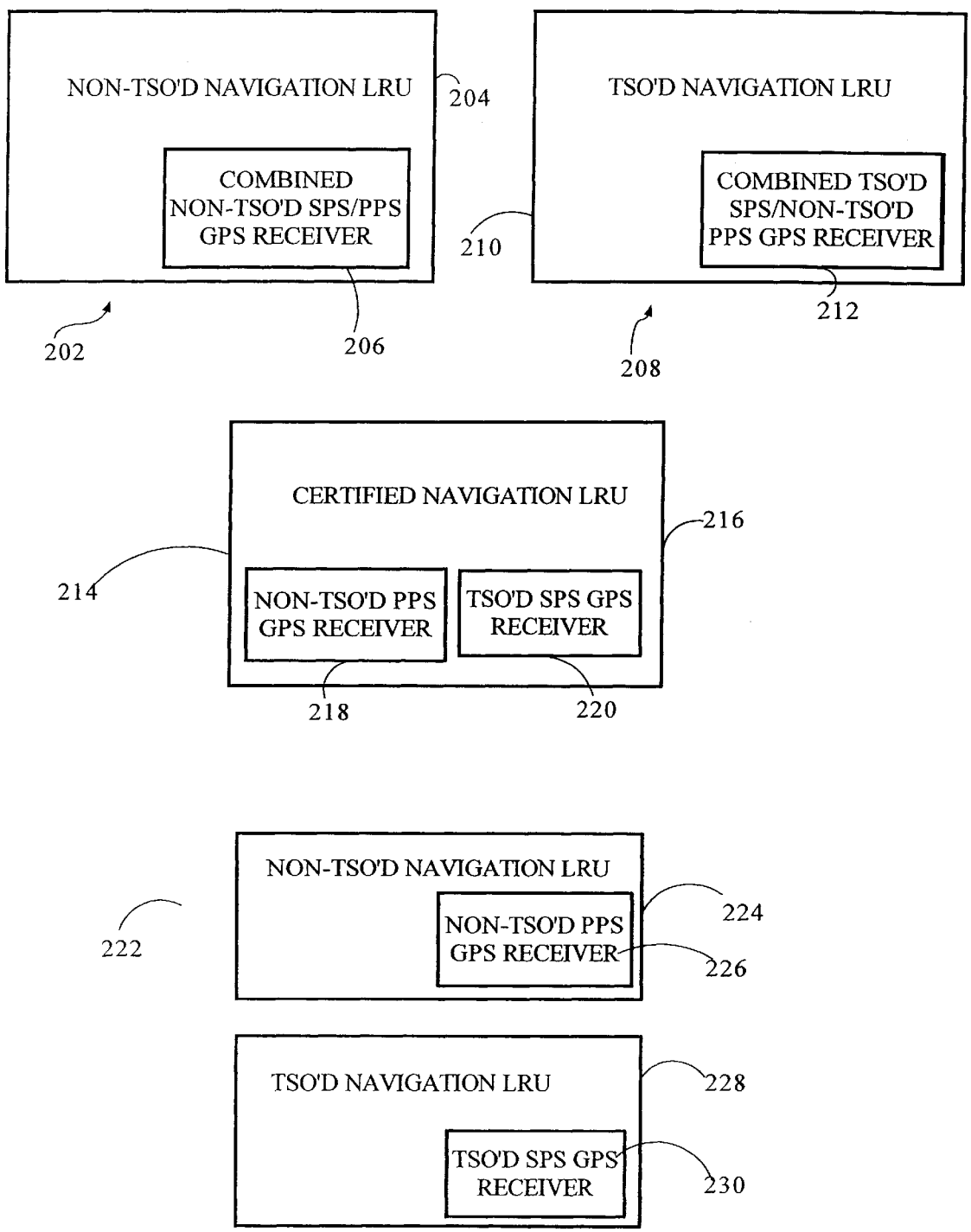
FIG. 2 is a block diagram depicting exemplary options as shown in FIG. 1 wherein navigational systems include various combinations of certified and non-certified global navigation system components.

Referring now to FIG. 2, an illustration of the exemplary options of the present invention as described in relation to FIG. 1 is shown. The first option 202 includes a non-certified navigation line replaceable unit 204 which includes a combined non-TSO'd SPS and PPS GPS receiver 206. The second option 208 includes a certified navigation line replaceable unit 210 with a combined TSO'd SPS/Non-TSO'd PPS GPS receiver 212. The third option 214 includes a certified navigation line replaceable unit 216 including a TSO'd SPS GPS Receiver 218 and a Non-TSO'd PPS GPS Receiver 220. The third option 214 includes the TSO'd SPS GPS Receiver 218 and the Non-TSO'd PPS GPS Receiver 220 in a single certified line replaceable unit 216. The fourth option 222 includes a first non-certified navigation line replaceable unit 224 including a non-TSO'd PPS GPS Receiver 226 and a second certified Navigation line replaceable unit 228 including a TSO'd SPS GPS receiver 230. Thus, the fourth option provides separate line replaceable units 224 and 228 to enable the replacement and testing of the PPS GPS receiver 226 and the SPS GPS receiver 230 separately.

Referring generally now to FIGS. 3 through 5, exemplary criteria are shown that may be utilized for analysis of the desirability of the exemplary options shown in FIGS. 1 and 2. To structure this analysis, the four exemplary options will be evaluated based on development costs, integration costs, certification costs, upgrade costs, hardware costs and total life cycle cost. In addition, the operational impact to the existing platforms will be identified, such as aircraft certification issues and future upgrade issues.

Referring now to FIG. 3 a chart is shown illustrating exemplary evaluation criteria including cost aspects of the exemplary options shown in FIGS. 1 and 2. The first option includes a non-certified navigation line replaceable unit including a combined non-TSO'd SPS and PPS GPS receiver. The development costs of both the system and receiver, as well as the initial system integration costs would be low, but the aircraft certification costs would be very high. This is due to the fact that neither the PPS nor the SPS receiver is TSO'd, an essential system of the aircraft, thus making it especially difficult to certify the aircraft. The second option includes a certified navigation line replaceable unit with a combined TSO'd SPS/Non-TSO'd PPS GPS receiver. The system development costs would be low, but the receiver development costs would be high. This is because both the PPS and the SPS receiver must be developed and maintained to stringent RTCA/DO-178B software development standards. The initial system integration costs for the coarse acquisition GPS receiver would be low since the MMR already drives the instruments, but the integration costs for the P(Y) GPS receiver would be medium because of the necessity of rewiring to unique PPS interfaces. Further, the effect on aircraft certification costs would be low because the LRU is already certified.

The third option includes a TSO'd SPS GPS Receiver and the Non-TSO'd PPS GPS Receiver in a single certified line replaceable unit. The system development costs would be of a medium cost factor as the system would have to be designed to accept the single line replaceable unit. However, the receiver development costs would be low since the receivers themselves would not be combined. The initial system integration costs for the coarse acquisition GPS receiver would be low since the MMR already drives the instruments, but the integration costs for the P(Y) GPS receiver would be medium because of the necessity of rewiring to unique PPS interfaces. Additionally, the aircraft certification costs would be low since the line replaceable unit is certified.

The fourth option includes a first non-certified navigation line replaceable unit including a non-TSO'd PPS GPS Receiver and a second certified Navigation line replaceable unit including a TSO'd SPS GPS receiver. The development costs of the fourth option would be of a medium level due to the requirement of integrating the separate unit in the system. However, the initial system integration costs would be low. Further, the receiver development costs would be low since extensive modifications to the receiver would not be necessary and the aircraft certification costs would be low due to the use of a certified line replaceable unit with a certified SPS receiver. Therefore, in the fourth option, the SPS receiver in the line replaceable unit may be TSO'd and upgraded separately from the PPS receiver, providing greater flexibility and increased cost savings.

Referring now to FIG. 4, a chart is shown illustrating exemplary evaluation criteria including upgrade costs of the exemplary options shown in FIGS. 1 and 2. The first option, a non-TSO'd combined SPS & PPS receiver, would have low upgrade costs. For example, upgrading a selective availability anti-spoofing module (SAASM), Wide-Area Active Surveillance (WAAS), Joint Precision Approach and Landing System (JPALS), and the like would barely be affected because this option is not certified. However, the second option, a TSO'd navigation line replaceable unit with a combined TSO'd SPS/Non-TSO'd PPS GPS receiver, would have very high upgrade costs because the entire unit would have to be recertified. The third option, a TSO'd SPS GPS Receiver and the Non-TSO'd PPS GPS Receiver in a single line replaceable unit, would have a medium upgrade cost, but would have lower upgrade costs than option two. This is because the receiver is in one integrated unit, thus requiring a higher certification cost but it may be removed and certified separately from the system. The fourth option, a first non-TSO'd navigation line replaceable unit including a non-TSO'd PPS GPS receiver and a second TSO'd Navigation line replaceable unit including a TSO'd SPS GPS receiver would have low upgrade costs. This is because the by providing a SPS receiver and PPS receiver in separate line replaceable units, upgrades made to either receiver may be done as needed without unnecessary changes to the non-upgraded portion. However, the equipment size of option four is greater than for options one, two or three due to the provision of separate line replaceable units (LRUs).

The equipment costs of option one and option two are lower than for options three and four due to the configuration as a line replaceable unit. However, the life cycle costs for options one and four are lower than for options two and three. In the case of option four, the life-cycle cost is lower due to the ability to replace either the SPS receiver or PPS receiver as needed, whereas the totality of the SPS and PPS receiver must be replaced in options two and three if defective or in need of upgrade. Thus, even though option four may have a higher initial cost in certain instances, the long-term costs of operation of option four will be lower.

Referring now to FIG. 5, a chart is shown illustrating exemplary evaluation criteria including risks and issues of the exemplary options shown in FIGS. 1 and 2. The operational impact of option one is great, even to the point where civil interoperability is questionable because the unit is not certified. However, the civil interoperability of options two, three, and four is good, due in large part to the certification of the combined SPS & PPS receiver in options two and three as well as the separate SPS receiver in option four. Thus, the certification of the unit is desirable to promote interoperability of the system in a civil airspace.

The impact on the certification of the aircraft varies greatly by option. For example, for option one it is very difficult to certify the aircraft because the GPS receiver is not certified, and there is no recertification of the GPS when changed. For option two, there is questionable aircraft certification because the TSO could be invalidated if the PPS receiver is allowed to drive landing instruments. Additionally, the receiver must be recertified after every modification, regardless of whether the modification is to the SPS receiver or the PPS receiver. Option three makes it fairly easy to certify the aircraft because the line replaceable unit (LRU) is certified. However, there is a need for certification update when the PPS receiver is changed. Since the PPS and SPS receivers are separate modules, it is expected that recertification will be relatively easy and inexpensive. Option four offers easy aircraft certification due to the certification of the separate SPS, and its certification as a line replaceable unit. Thus, like option two, recertification is only necessary when the SPS receiver is changed. However, unlike options two and three, option four offers easy changeability of the SPS receiver as a line replaceable unit.

Additionally, certification may have an effect on upgrading the unit. For example, in option two, the receiver must be recertified after every modification. Therefore, the costs of the recertification will likely cause a delay in upgrades. Regarding option three, having a non-TSO'd PPS receiver in the line replaceable unit may also delay upgrades, as it is necessary to reintegrate and recertify the line replaceable unit when upgrading. There are no upgrade issues with options one and four. Thus, upgrades may be performed without additional recertification and reintegration costs in these instances.

Figure 6:
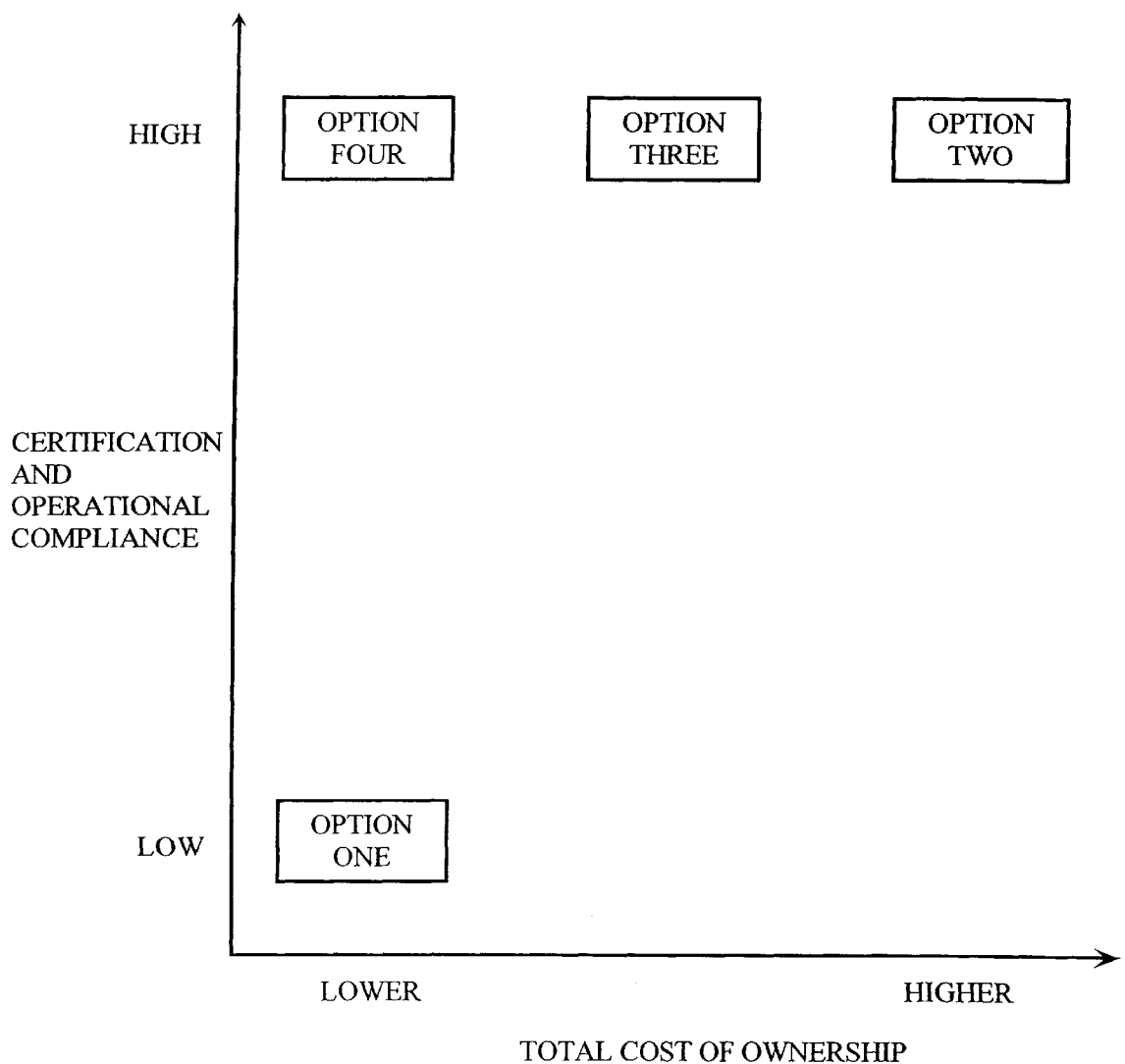
FIG. 6 is a chart depicting a summary of the exemplary criteria as discussed in relation to FIGS. 3, 4 and 5 for evaluating compliance options.

Referring now to FIG. 6, a chart is shown summarizing the exemplary criteria as discussed in relation to FIGS. 3, 4 and 5 for evaluating compliance options. Option one has a low total cost of ownership due to the uncertified status of the combined SPS and PPS receiver. However, option one also has low certification and operation compliance for the exact same reasons. Thus, option one cannot be considered under the premise that the multi mode receiver (MMR) must be TSO certified. Option two has high certification and operational compliance, however, the cost of ownership is very high due to the price of combining and updating the PPS and SPS receivers. Option two has extremely high recertification costs, since the P(Y) changes will, by definition, impact the FAA safety critical functions. This is because the C/A receiver and P(Y) receiver share common signal processing hardware. Option three is desirable due to the high certification and operation compliance with a medium cost of ownership due to the combination of TSO'd and non-TSO'd receivers in the same line replaceable unit, forcing a reintegration of the line replaceable unit when upgrading. This option does require minor line replaceable unit (LRU) recertification after each PPS upgrade. However, these costs are minimal, provided that the P(Y) GPS receiver changes do not impact the FAA safety critical functions. In addition, this approach does have a size advantage over option four. The cost of replacing the entire line replaceable unit including both the PPS receiver and SPS receiver is the basis of a medium cost of ownership. Option four is desirable, with a lower total cost of ownership due to the ability to replace either the SPS receiver or the PPS receiver as needed, as well as the ability to upgrade separately as well. Additionally, option four has a high level of certification and operation compliance due to the certification of the SPS receiver for civilian flight operations. Thus, commercially available equipment may be utilized with extensive modifications for tactical use. In essence, this approach provides the solution with the lowest life cycle cost (LCC), wile allowing maximum flexibility for future upgrades in both the C/A and P(Y) receivers.

Figure 7:
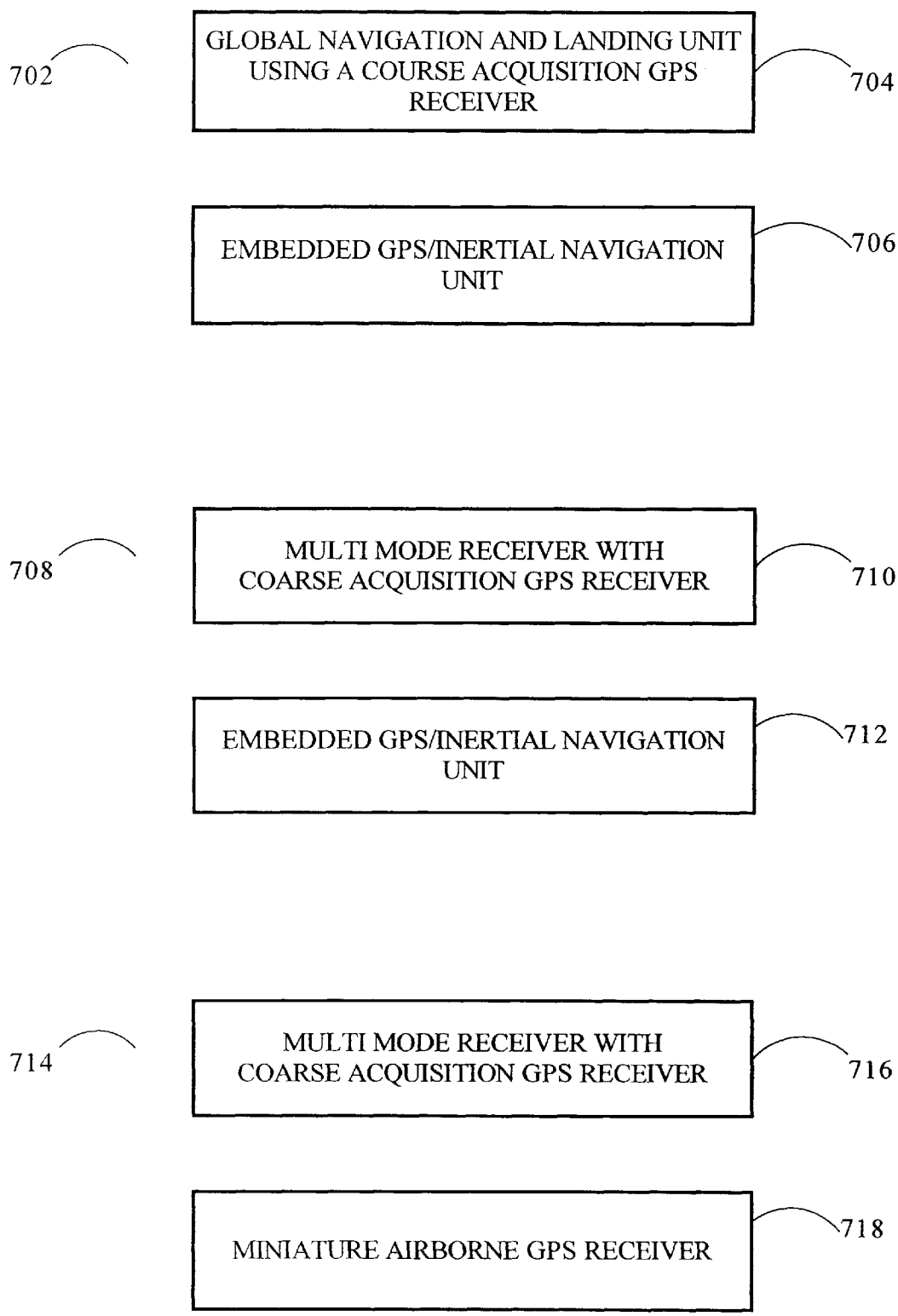
FIG. 7 is a block diagram depicting exemplary embodiments of the present invention.

Referring now to FIG. 7, exemplary embodiments of the present invention are shown wherein a split architecture SPS/PPS receiver is shown suitable for utilization in a navigation system. An advantage of option four is its ability to integrate with existing navigation equipment such as the EGI and MAGR, shown in FIG. 7. The system may include a first non-TSO'd navigation line replaceable unit including a non-TSO'd PPS GPS receiver and a second TSO'd navigation line replaceable unit including a TSO'd SPS GPS receiver. In a first example, a navigation system 702 may include a global navigation and landing unit (GNLU) using a coarse acquisition (C/A) GPS receiver 704. The navigation system 702 may also include an embedded GPS/Inertial (EGI) navigation unit 706. Thus, the global navigation and landing unit (GNLU) may be certified separately to enable the aircraft to comply with civilian airspace requirements yet still utilize the precision of the embedded GPS/Inertial (EGI) navigation unit 706. Additionally, a navigation system 708 may include a multi mode receiver (MMR) with coarse acquisition (C/A) GPS receiver 710 and embedded GPS/Inertial (EGI) navigation unit 712. Likewise, the multi mode receiver (MMR) with coarse acquisition (C/A) GPS receiver may be certified separately to enable the aircraft to comply with civilian airspace requirements yet still utilize the precision of the embedded GPS/Inertial (EGI) navigation unit 712. Further, a navigation system 714 may include a multi mode receiver (MMR) with coarse acquisition (C/A) GPS receiver 716 and a miniature airborne GPS receiver (MAGR) 718. Thus, the split PPS/SPS architecture for military aircraft flying in civilian airspace of the present invention is able to satisfy disparate requirements of the Civil Aviation Authorities (CAA) and Military aviation requirements while remaining cost effective in both production, operation and upgrade expenses. It should be apparent that although exemplary PPS and SPS receivers are discussed, a variety of PPS and SPS receivers are contemplated by the present invention without departing from the spirit and scope thereof.

It is believed that the split PPS/SPS architecture for military aircraft flying in civilian airspace of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A navigation system suitable for use in civilian airspace, comprising:
    a line replaceable unit (LRU), including
        a first precise positioning service (PPS) global positioning system (GPS) receiver; and
        a second standard positioning service (SPS) global positioning system (GPS) receiver;
        wherein the second standard positioning service (SPS) global positioning system (GPS) receiver is suitable for at least one of certification, upgrade and replacement independent of the first precise positioning service (PPS) global positioning system (GPS).

2. The navigation system as described in claim 1, wherein certification includes certification by civil aviation authorities (CAA) for compliance with requirement for flight in civilian airspace.

3. The navigation system as described in claim 2, wherein the certification includes compliance with Global Air Traffic Management (GATM).

4. The navigation system as described in claim 1, wherein the first precise positioning service (PPS) global positioning system (GPS) receiver includes at least one of an embedded GPS/Inertial (EGI) navigation unit and a miniature airborne GPS receiver (MAGR).

5. The navigation system as described in claim 1, wherein the second standard positioning service (SPS) global positioning system (GPS) receiver includes at least one of a global navigation and landing unit (GNLU) using a coarse acquisition (C/A) GPS receiver and a multi mode receiver (MMR) with coarse acquisition (C/A).

6. The navigation system as described in claim 1, wherein the second standard positioning service (SPS) global positioning system (GPS) receiver is certified for compliance with a corresponding technical standard order (TSO).

7. The navigation system as described in claim 1, wherein the line replaceable unit (LRI) is certified for compliance with a corresponding technical standard order (TSO).

* * * * *